United States Patent
Willmott et al.

(10) Patent No.: US 11,587,237 B2
(45) Date of Patent: Feb. 21, 2023

(54) IMAGE SEGMENTION VIA EFFICIENT SEMIDEFINATE-PROGRAMMING BASED INFERENCE FOR BINARY AND MULTI-CLASS MARKOV RANDOM FIELDS

(71) Applicant: Robert Bosch GmbH, Stuttgart (DE)

(72) Inventors: Devin T. Willmott, Pittsburgh, PA (US); Chirag Pabbaraju, Pittsburgh, PA (US); Po-Wei Wang, Pittsburgh, PA (US); Jeremy Kolter, Pittsburgh, PA (US)

(73) Assignee: Robert Bosch GmbH

( * ) Notice: Subject to any disclaimer, the term of this patent is extended or adjusted under 35 U.S.C. 154(b) by 95 days.

(21) Appl. No.: 17/107,437

(22) Filed: Nov. 30, 2020

(65) Prior Publication Data

US 2022/0172372 A1 Jun. 2, 2022

(51) Int. Cl.
| | |
|---|---|
| *G06T 7/162* | (2017.01) |
| *G06T 7/143* | (2017.01) |
| *B60W 40/10* | (2012.01) |
| *B60W 40/02* | (2006.01) |
| *G06T 7/194* | (2017.01) |

(52) U.S. Cl.
CPC .......... *G06T 7/162* (2017.01); *B60W 40/02* (2013.01); *B60W 40/10* (2013.01); *G06T 7/143* (2017.01); *G06T 7/194* (2017.01); *B60W 2420/52* (2013.01)

(58) Field of Classification Search
CPC ......... G06T 7/162; G06T 7/143; G06T 7/194; G06T 7/11; B60W 40/02; B60W 40/10; B60W 2420/52
See application file for complete search history.

(56) References Cited

U.S. PATENT DOCUMENTS

2002/0028021 A1* 3/2002 Foote .................. G06V 10/764
382/224

OTHER PUBLICATIONS

Frieze, Alan, and Mark Jerrum. "Improved approximation algorithms for MAX κ-CUT and MAX BISECTION." International Conference on Integer Programming and Combinatorial Optimization. Springer, Berlin, Heidelberg, 1995, 20 pages.

* cited by examiner

*Primary Examiner* — Chan S Park
*Assistant Examiner* — Daniel C Chang
(74) *Attorney, Agent, or Firm* — Dickinson Wright PLLC

(57) ABSTRACT

A system for controlling a physical system via segmentation of an image includes a controller. The controller may be configured to receive an image of n pixels from a first sensor, and an annotation of the image from a second sensor, form a coupling matrix, k class vectors each of length n, and a bias coefficient based on the image and the annotation, generate n pixel vectors each of length n based on the coupling matrix, class vectors, and bias coefficient create a single segmentation vector of length n from the pixel vectors wherein each entry in the segmentation vector identifies one of the k class vectors, output the single segmentation vector; and operate the physical system based on the single segmentation vector.

20 Claims, 14 Drawing Sheets

FIG. 6C
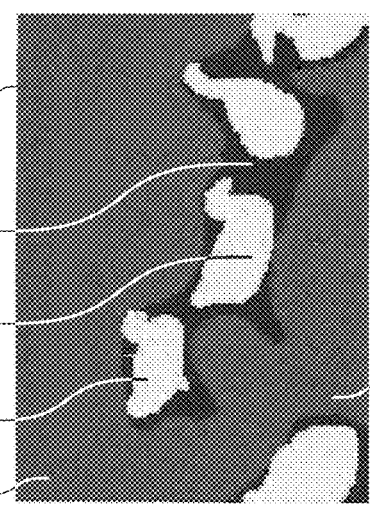
FIG. 6B
FIG. 6A
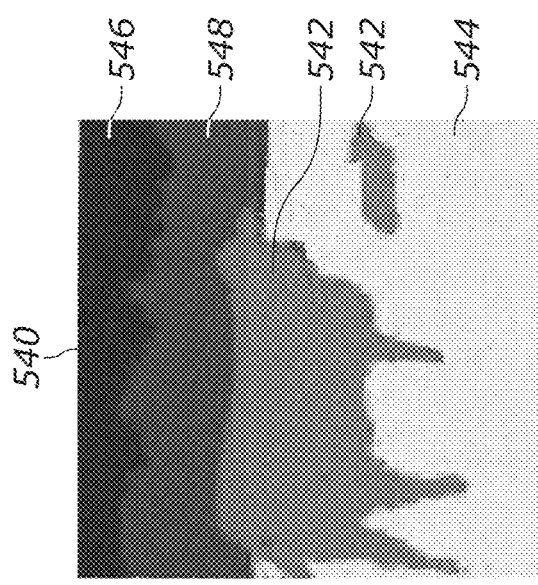
FIG. 5C
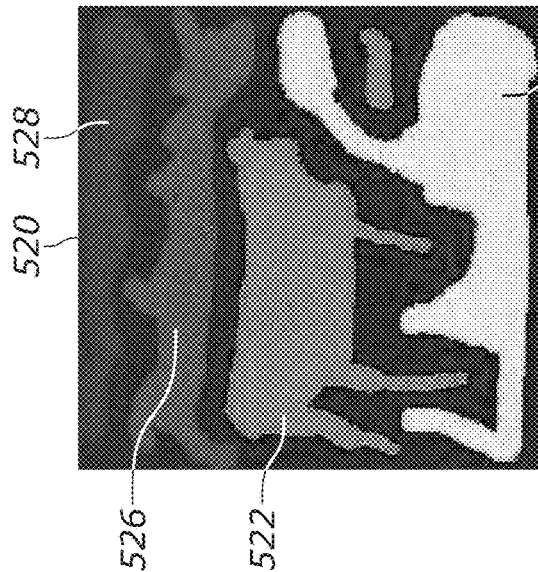
FIG. 5B
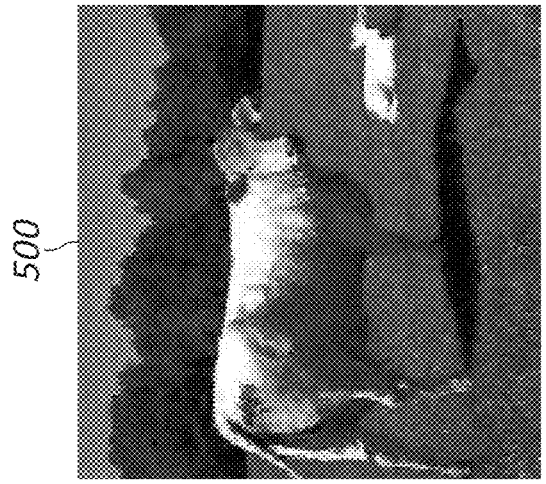
FIG. 5A

IMAGE SEGMENTION VIA EFFICIENT SEMIDEFINATE-PROGRAMMING BASED INFERENCE FOR BINARY AND MULTI-CLASS MARKOV RANDOM FIELDS

TECHNICAL FIELD

This invention relates generally to systems and methods of image classification and operation based on the resulting classification.

BACKGROUND

Undirected graphical models or Markov Random Fields (MRFs) are used in various real-world applications like computer vision, computational biology, etc. because of their ability to concisely represent associations amongst variables of interest.

SUMMARY

A method of image segmentation includes receiving an image of n pixels and an annotation of the image, forming a coupling matrix, k class vectors each of length n, and a bias coefficient based on the image and the annotation, generating n pixel vectors each of length n based on the coupling matrix, class vectors, and bias coefficient, creating a single segmentation vector of length n from the pixel vectors wherein each entry in the segmentation vector identifies one of the k class vectors, and outputting the single segmentation vector.

A system for controlling a physical system via segmentation of an image includes a controller. The controller may be configured to receive an image of n pixels from a first sensor, and an annotation of the image from a second sensor, form a coupling matrix, k class vectors each of length n, and a bias coefficient based on the image and the annotation, generate n pixel vectors each of length n based on the coupling matrix, class vectors, and bias coefficient create a single segmentation vector of length n from the pixel vectors wherein each entry in the segmentation vector identifies one of the k class vectors, output the single segmentation vector; and operate the physical system based on the single segmentation vector.

A system for segmenting an image for vehicle control includes a first and second sensor and a controller. The first sensor may be configured to generate an image of n pixels. The second sensor may be configured to generate an annotation of the image. The controller may be configured to receive an image of n pixels, and an annotation of the image, form a coupling matrix, k class vectors each of length n, and a bias coefficient based on the image and the annotation, generate n pixel vectors each of length n based on the coupling matrix, class vectors, and bias coefficient, create a single segmentation vector of length n from the pixel vectors wherein each entry in the segmentation vector identifies one of the k class vectors, output the single segmentation vector; and operate the vehicle based on the single segmentation vector.

BRIEF DESCRIPTION OF THE DRAWINGS

FIG. 5A illustrates a graphical representation of an image.

FIG. 5B illustrates a graphical representation of the image of FIG. 5A after annotation.

FIG. 5C illustrates a graphical representation of the image of FIG. 5A after Segmentation.

FIG. 6A illustrates a graphical representation of an image.

FIG. 6B illustrates a graphical representation of the image of FIG. 6A after annotation.

FIG. 6C illustrates a graphical representation of the image of FIG. 6A after Segmentation.

DETAILED DESCRIPTION

Figure 1A:
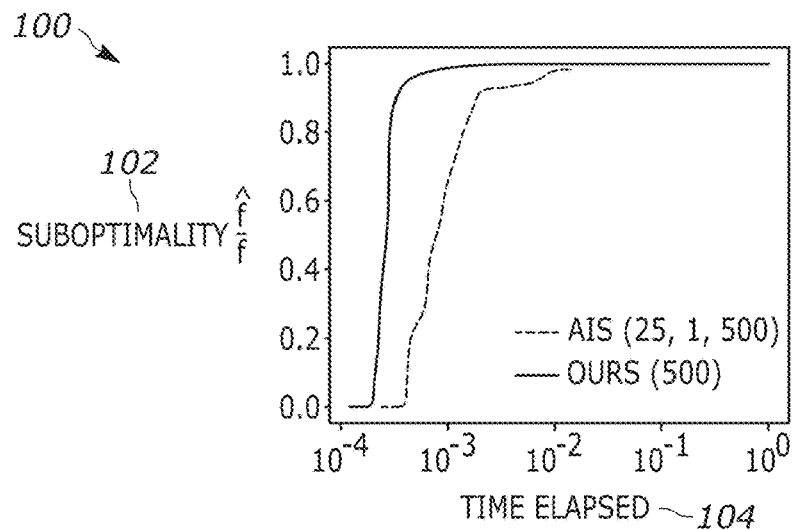
FIG. 1A illustrates a graphical representation of Sub-optimality in relation to elapsed time when k is 2 and N is 20.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

The term image refers to a representation or artifact that depicts perception (e.g., a visual perception from a point of view), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image.

Probabilistic inference in pairwise Markov Random Fields (MRFs), i.e. computing the partition function or computing a MAP estimate of the variables, is a foundational problem in probabilistic graphical models. Semidefinite programming relaxations have long been a theoretically powerful tool for analyzing properties of probabilistic inference, but have not been practical owing to the high computational cost of typical solvers for solving the resulting SDPs. This disclosure proposes an efficient method for computing the partition function or MAP estimate in a pairwise MRF by instead exploiting a recently proposed coordinate-descent-based fast semidefinite solver, combined with importance sampling. This disclosure also extend semidefinite relaxations from the typical binary MRF to the full multi-class setting, and develop a compact semidefinite relaxation that can again be solved efficiently using the solver. This disclosure shows that the method substantially outperforms (both in terms of solution quality and speed) the existing state of the art in approximate inference, on benchmark problems drawn from previous work. This disclosure also shows that this approach can scale to large MRF domains such as fully-connected pairwise CRF models used in computer vision.

Undirected graphical models or Markov Random Fields (MRFs) are used in various real-world applications like computer vision, computational biology, etc. because of their ability to concisely represent associations amongst variables of interest. A general pairwise MRF over binary random variables $x \in \{-1,1\}^n$ may be characterized by the following joint distribution $$p(x) \propto \exp(x^T A x + h^T x), \quad (1)$$

where $A \in \mathbb{R}^{n \times n}$ denotes the "coupling matrix" and encodes symmetric pairwise correlations, while $h \in \mathbb{R}^n$ consists of the biases for the variables. In this model, there are three fundamental problems of interest: (a) estimating the mode of the distribution, otherwise termed as maximum a posteriori (MAP) inference (b) estimating p(x) for a configuration x or generating samples from the distribution, and (c) learning the parameters (A,h) given samples from the joint distribution. Since there are an exponentially large number of configurations in the support of the MRF, the problem of finding the true mode of the distribution is in general hard. Similarly, to compute the probability p(x) of any particular configuration, one has to compute the constant of proportionality in (1) which ensures that the distribution sums up to 1. This constant, denoted as Z, is called the partition function, where $$Z = \sum_{x \in \{-1,1\}^n} \exp(x^T A x + b^T x). \quad (2)$$

Since computing Z also involves summing over an exponentially large number of terms, computing the true Z exactly for an MRF is also generally difficult. The problem becomes harder still when one goes beyond binary random variables and consider the case of a general multi-class MRF (also termed as a Potts model), where each variable can take on values from a finite set. Since a central task in inference (e.g., estimating p(x) for a configuration x or generating samples from the distribution) requires computing Z accurately yet efficiently, several approximations have been proposed. These approximation methods have typically suffered in the quality of their approximations in the case of problem instances in which the entries of A have large magnitude which is referred to as the low-temperature setting.

Considering a proposed a novel spectral algorithm that provably computes an approximate estimate of the partition function in time polynomial in the dimension n and spectral properties of A. This algorithm is fast, and significantly outperforms popular techniques used in approximate inference, particularly in the low-temperature setting. However, the experimental results suggest that there is still room for improvement in this setting. Furthermore, it is unclear how this method could be conveniently generalized to the richer domain of multi-class MRFs.

Another well-studied approach to compute the mode, i.e. the maximizer of the RHS in (Eq. 1), is to relax the discrete optimization problem to a semidefinite program (SDP) and solve the SDP instead. Rounding techniques like randomized rounding are then used to round the SDP solution to the original discrete space. In particular, employing this approach in the case of a binary RBM demonstrated impressive results. Next is to draw parallels between mode estimation in a general k-class Potts model and the $M_{AX}$ k-CUT problem, and suggest an SDP relaxation for the same. However, the relaxation has a quadratic number of constraints in the number of variables in the MRF. Therefore, using traditional convex program solvers employing the primal dual-interior point method to solve the SDP would be computationally very expensive for large MRFs.

This disclosure proposes solving a fundamentally different SDP relaxation for performing inference in a general k-class Potts model, that can be solved efficiently via a low-rank SDP solver, and illustrate that this method performs accurately and efficiently in practice, scaling successfully to large MRFs. This SDP relaxation has only a linear number of constraints in the number of variables in the MRF. This allows exploitation of a low-rank solver based on coordinate descent, called the "Mixing method", which converges extremely fast to a global optimum of the proposed relaxation with high probability. A further proposal is a simple importance sampling-based method to estimate the partition function. That is, once a solution to the SDP is achieved, a rounding procedure on the solution to obtain samples in the discrete space is disclosed. However, since the mixing method converges to a global optimum almost certainly, the samples returned by the rounding are closely clustered around the true mode. Therefore, to ensure additional exploration in the space of the samples, a fraction of samples from the uniform distribution on the discrete hypercube is obtained. The combination results in an accurate estimate of the partition function.

The experimental results illustrate that this technique excels in both mode and partition function estimation, when compared to state-of-the-art methods like Spectral Approximate Inference, as well as specialized Markov Chain Monte Carlo (MCMC) techniques like Annealed Importance Sampling (AIS), especially in the low temperature setting. Not only does this method outperform these methods in terms of accuracy, but it also runs significantly faster, particularly compared to AIS. The results have been displayed for synthetic binary MRF settings, as well as synthetic multi-class MRFs. Finally, it will be demonstrated that, owing to the efficiency of the fast SDP solver, this method is able to scale to large real-world MRFs used in image segmentation tasks.

Variational methods and Continuous relaxations: One popular class of approaches in approximate inference consists of framing a relevant optimization problem whose solution can be treated as a reasonable approximation to the true mode/partition function. This includes techniques employing the Gibbs variational principle that solve an optimization problem over the set of all possible distributions on the random variables (generally intractable). Amongst these, the mean-field approximation, which makes the simplifying (and possibly inaccurate) assumption of a product distribution amongst the variables, is extremely popular. Belief propagation is another popular algorithm used for inference that has connections to variational inference, but has strong theoretical guarantees only when the underlying MRFs are loop-free. In addition, several LP-based and SDP-based continuous relaxations to the discrete optimization problem have been proposed. In particular, consider to first model the problem of estimating the mode in a multi-class MRF as an instance of the $M_{AX}$ k-$C_{UT}$ problem and then propose an SDP relaxation as well as rounding mechanism for the same. Generally, such SDP-based approaches are theoretically attractive to analyze, but practically infeasible for large MRFs with many constraints due to their high computational cost.

Markov chain Monte Carlo (MCMC) and Sampling-based methods: Another class of approaches involves running MCMC chains whose stationary distribution is the one specified by (Eq. 1). These methods run a particular number of MCMC steps and then do some sort of averaging over the samples at the end of the chain. Popular methods include Gibbs sampling and Metropolis-Hastings. A significant development in these methods was the introduction of annealing over a range of temperatures, which computes an unbiased estimate of the true partition function. Thereafter, several other methods in this line that employ some form of annealing and importance sampling have emerged. However, it is typically difficult to determine the number of steps that the MCMC chain requires to converge to the stationary distribution (denoted mixing time). Further, as mentioned above, both variational methods (due to their propensity to converge to suboptimal solutions) and MCMC methods (due to large mixing times) are known to underperform in the low-temperature setting.

Other methods: Some other popular techniques for inference include variable elimination methods like bucket elimination, that typically use a form of dynamic programming to approximately marginalize the variables in the model one-by-one. A significant recent development in approximate inference, which is also based on dynamic programming, is the spectral approach. By viewing the enumeration of all possible configurations of the random variables in the function space, one can build a bottom-up approximate dynamic programming tree which yields a fully-polynomial time approximation scheme for estimating the partition function, and markedly outperforms other standard techniques. However, as mentioned above, it is a priori unclear how their method could be extended to the multi-class Potts model, since their bottom-up dynamic programming chain depends on the variables being binary-valued. Here, a method that does not purely belong to either of the first two categories above as it involves both an SDP relaxation and importance sampling that may be successfully generalizes to multi-class MRFs.

In this section, a formulation of SDP relaxation which is proposed to solve for mode estimation in a k-class Potts model. First, one may state the optimization problem for mode estimation in a binary MRF as shown in Eq. 2:

$$\max_{x \in \{-1,1\}^n} x^T A x + h^T x \tag{2}$$

The above problem can be equivalently stated as Eq. 3 below:

$$\max_{x \in \{-1,1\}^n} \sum_{i=1}^{n} \sum_{j=1}^{n} A_{ij} \hat{\delta}(x_i, x_j) + \sum_{i=1}^{n} \sum_{j=1}^{n} \hat{h}_i^{(l)} \hat{\delta}(x_i, l) \tag{3}$$

In which $$\hat{\delta}(a, b) = \begin{cases} 1 & \text{if } a = b \\ -1 & \text{otherwise} \end{cases} \tag{4}$$

However, viewing the optimization problem thus helps to naturally extend the problem of mode estimation in a binary MRF to general k-class MRFs where the random variables can take values in a discrete domain $\{1, \ldots, k\}$ (denoted

[k]). For the general case, with the same definition of the $\hat{\delta}$ operator as above, one can frame a discrete optimization problem as in Eq. 5 below:

$$\max_{x \in [k]^n} \sum_{i=1}^{n} \sum_{j=1}^{n} A_{ij} \hat{\delta}(x_i, x_j) + \sum_{i=1}^{n} \sum_{j=1}^{n} \hat{h}_i^{(l)} \hat{\delta}(x_i, l). \tag{5}$$

in which one is now provided with bias vectors $\hat{h}^{(l)}$ for each of the k classes. For the case of (Eq. 5) (without the bias terms), one can first state an equivalent optimization problem defined over a simplex in $R^{k-1}$, and go on to derive the following relaxation for which theoretical guarantees hold see Eq. 6 below:

$$\max_{x \in [k]^n} \sum_{i=1}^{n} \sum_{j=1}^{n} A_{ij} v_i^T v_j \tag{6}$$

Subject to $v_i^T v_j \geq -\frac{1}{k-1} \forall i \neq j$.

The above problem (Eq. 6) can be equivalently posed as a convex problem over positive semidefinite matrices Y, albeit with $\sim n^2$ entry-wise constraints $Y_{ij} \geq -1/k-1$ corresponding to each pairwise constraint in $v_i$ and $v_j$. Thus, for large n, solving (Eq. 6) via traditional convex program solvers would be very expensive. Note further that, unlike the binary case (where the pairwise constraints hold trivially), it would also be challenging to solve this problem with low-rank methods, owing to the quadratic number of constraints.

Towards this, an alternative relaxation is presented to (Eq. 5) which reduces the number of constraints to be linear in n. Observe that the pairwise constraints in (Eq. 6) are in a sense controlling the separation between pairs of vectors and trying to keep them roughly aligned with the vertices of a simplex. With this insight, the incorporation of the functionality of these constraints within the criterion by plugging them in as part of the bias terms is performed. Specifically, fix $r_1, \ldots, r_k \in R^n$ to lie on the vertices of a simplex, so that $$r_l^T r_{l'} = \begin{cases} 1 & \text{if } l = l^0 \\ -\frac{1}{k-1} & \text{if } l \neq l^0 \end{cases}.$$

Then, it can be shown that the following Eq. 7 holds:

$$\hat{\delta}(x_i, x_j) = \frac{2}{k}((k-1)r_{x_i}^T r_{x_j} + 1) - 1, \tag{7}$$

so that solving the following discrete optimization problem is identical to solving (Eq. 5):

$$\max_{v_i \in [r_1, \ldots, r_k], i \in [n]} \sum_{i=1}^{n} \sum_{j=1}^{n} A_{ij} v_i^T v_j + \sum_{i=1}^{n} \sum_{l=1}^{k} \hat{h}_i^{(l)} v_i^T r_l \tag{8}$$

The motivation here is trying to mimic the $\hat{\delta}$ operator in (Eq. 5) via inner products, but in such a way that the bias coefficients $\hat{h}_i^{(l)}$ determine the degree to which is aligned with a particular $r_l$. Thus, this incorporates the pairwise constraints in (Eq. 6) within the criterion. The next step, is to simply relax the domain of optimization in (Eq. 8) from the discrete set $\{r_i\}_{i=1}^{k}$ to unit vectors in $R^n$ so as to derive the following relaxation Eq. 9:

$$\max_{v_i \in R^n, \|v_i\|_2 = 1} \sum_{i=1}^{n} \sum_{j=1}^{n} A_{ij} v_i^T v_j + \sum_{i=1}^{n} v_i^T \sum_{l=1}^{k} \hat{h}_i^{(l)} r_l \tag{9}$$

Now, let $H \in R^{n \times k}$ such that $H_{ij} = \hat{h}_i^{(j)}$. Define the block matrix $C \in R^{(k+n) \times (k+n)}$ such that:

$$C = \begin{bmatrix} 0 & \frac{1}{2} \cdot H^T \\ \frac{1}{2} \cdot H & A \end{bmatrix}.$$

Then, the following convex program is equivalent to (Eq. 9):

$$\max_{Y \succeq 0} Y \cdot C \text{ subject to } Y_{ii} = 1 \forall i \in [k+n]; \tag{10}$$

$$Y_{ij} = -\frac{1}{k-1} \forall i \in [k], i < j \leq k.$$

Note that the number of constraints in (Eq. 10) is now only $$n + k + \frac{k(k-1)}{2} = n + \frac{k(k+1)}{2}$$

i.e. linear in n as opposed to the quadratic number of constraints in (Eq. 6). One can then use the results, which state that there indeed exists a low-rank solution to (Eq. 10) with rank d at most $$\left[ \sqrt{2 \left( n + \frac{k(k+1)}{2} \right)} \right].$$

Thus, one can instead work in the space $R^d$, leading to the following optimization problem:

$$\max_{v_i \in R^d, \|v_i\|_2 = 1} \sum_{i=1}^{n} \sum_{j=1}^{n} A_{ij} v_i^T v_j + \sum_{i=1}^{n} v_i^T \sum_{l=1}^{k} \hat{h}_i^{(l)} r_l \tag{11}$$

This low-rank relaxation can then be directly solved in its existing non-convex form, by using the method for solving constrained SDPs called the "mixing method". The mixing method exploits the norm constraint on the feasible set of (Eq. 11) to derive closed-form coordinate-descent updates for the maximization, and has been shown to be able to reach accurate solutions in just a few iterations. The pseudocode for solving (Eq. 11) via the mixing method is given in the block for Algorithm 1.

---

Algorithm 1 Solving (Eq. 11) via the mixing method

Input: A, $\{v_i\}_{i=1}^{n}$, $\{\hat{h}^{(l)}\}_{l=1}^{k}$, $\{r_l\}_{l=1}^{k}$
1: procedure MIXINGMETHOD:
2:  Initialize num_iters
3:  for i = 1, 2 ..., num_iters do

| Algorithm 1 Solving (Eq. 11) via the mixing method |
| --- |
| 4:  $g_i \leftarrow (2\Sigma_{j \neq i} A_{ij}v_j + \Sigma_{l=1}^k \hat{h}_i^{(l)} r_l)$ |
| 5:  $v_i \leftarrow \dfrac{g_i}{\|g_i\|_2}$ |
| 6:  end for |
| 7:  return $v_1, \ldots, v_n$ |
| 8:  end procedure |

| Algorithm 2: Rounding in the multi-class case |
| --- |
| Input: $\{v_i\}_{i=1}^n$, $\{r_l\}_{l=1}^k$ |
| 1: procedure ROUNDING: |
| 2:      Sample$\{m_l\}_{l=1}^k \sim$ Unif($S^d$) |
| 3:      for i = 1,2...,n do |
| 4:          $x_i \leftarrow \text{argmax}_{l \in [k]} v_{iT} m_l$ |
| 5:      end for |
| 6:      for i = 1,2...,n do |
| 7:          $x_i \leftarrow \text{argmax} l \in [k]\ m_{x_i}^T r_l$ |
| 8:      end for |
| 9:      return x |
| 10: end procedure |

Once a solution $v_1, \ldots, v_n$ to (Eq. 11) is achieved, next is a technique to round back these vectors to configurations in the discrete space $[k]^n$ to produce a single segmentation vector of length n, or equivalently, a single segmentation vector of dimension n (e.g., a single segmentation vector of n-dimensions), where each entry represents a class prediction for a particular pixel of the input image. For this purpose, a natural extension to the technique of randomized rounding which involves rounding the $v_i$s to k randomly drawn unit vectors. One can further extend this approach as described in Algorithm 2 for the purposes of rounding the SDP relaxation (Eq. 11). The first step in Algorithm 2, is to sample k unit vectors $\{m_l\}_{l=1}^k$ uniformly on the unit sphere $S^d$ and perform rounding. However, reconciliation of this rounding with the truth vectors on the simplex must be performed. Thus, in the second step, reassignment of each rounded value to a truth vector is performed: if $v_i$ was mapped to $m_l$ in the first step, it now maps it to $r_{lo}$ such that $m_l$ is closest to $r_{lo}$. In this way, one can obtain a bunch of rounded configurations, and output as the mode the one that has the maximum criterion value in (Eq. 5).

In this section, this disclosure deal with the other fundamental problem in inference: estimating the partition function. Following Section 3 above, the joint distribution in a k-class MRF can be expressed as:

$$p(x) \propto \exp(\Sigma_{i=1}^n \Sigma_{j=1}^n A_{ij} \hat{\delta}(x_i, x_j) + \Sigma_{i=1}^n \Sigma_{l=1}^k \hat{h}_i^{(l)} \hat{\delta}(x_i, l)) \quad (12)$$

As stated previously, the central aspect in computing the probability of a configuration x in this model is being able to calculate the partition function Z. The expression for the partition function in (Eq. 12) is:

$$Z = \sum_{x \in [k]^n} \exp\left(\sum_{i=1}^n \sum_{j=1}^n A_{ij} \hat{\delta}(x_i, x_j) + \sum_{i=1}^n \sum_{l=1}^k \hat{h}_i^{(l)} \hat{\delta}(x_i, l)\right) \quad (13)$$

| Algorithm 3: Estimation of Z |
| --- |
| Input: $k, \{v_i\}_{i=1}^n, \{r_l\}_{l=1}^k$ |
| 1: procedure PARTITIONFUNCTION: |
| 2:      Initialize $R \in Z, u \in [0,1]$, $X_{p_v} = [\ ]$, $X_\Omega = [\ ]$ |
| 3:      for i = 1,2 ... ,R do |
| 4:          With probability u, sample $x \sim p_v$ using Algorithm 2 and add x to $X_{p_v}$ |
| 5:          Else sample $x \sim \Omega$ and add x to $X_\Omega$ |
| 6:      end for |
| 7:      Compute empirical estimate $\hat{p}_v$ from histogram on $X_{p_v}$ |
| 8: |
| 9: |
| 10:     return $\hat{Z}$ |
| 11: end procedure |

Beginning with the intuition that the solution to (Eq. 5) can be useful in computing the partition function. This intuition indeed holds if the terms in the summation are dominated by a few entries with large values (configurations around the mode). This happens to the case when one considers coupling matrices A that have entries with large magnitude (low temperature setting).

With this motivation, a simple algorithm to estimate Z that exploits the solution to the relaxed problem (Eq. 11) is presented. The rounding procedure described in Algorithm 2 induces a distribution on x in the original space (note however that for small values of d, this distribution does not have a full support of $[k]^n$). Let us denote this distribution as $p_v$. For the case when d=2, a geometric technique for exactly calculating $p_v$, and derive a standard importance sampling estimate of Z based on the empirical expectation $\hat{E}[\text{cir}(f(x))/p_v(x)]$. However, this approach does not scale to higher dimensions, and also largely biases the estimate of Z solely towards the mode. Thus, in order to encourage exploration in the entirety of the space spanned by $[k]^n$, as well as to reduce the bias, this disclosure proposes using a fraction of samples from the uniform distribution $\Omega$ on $[k]^n$ and employ importance sampling on a combination of samples from $\Omega$ and $p_v$. That is, sample from $p_v$ with some probability u, and from $\Omega$ with probability 1−u. After thus having obtained a mix of samples from both these distributions, compute an importance sampling estimate of Z. The overall procedure is described in detail in Algorithm 3:

Theorem 1. The estimate $\hat{Z}$ given by Algorithm 3 is asymptotically unbiased i.e. $\lim_{R \to \infty} E[\hat{Z}] = Z$. 5

In this section, validation of the formulation on a variety of MRF settings, both synthetic and realworld are presented. Following its usage, the notion of "coupling strength" of a matrix $A \in R_{n \times n}$, which determines the temperature of the problem instance can be expressed as Eq. 14 below:

$$CS(A) = \frac{1}{n(n-1)} \sum_{i \neq j} |A_{ij}|. \quad (14)$$

The coupling matrices are generated as follows: for a coupling strength c, the entries on edges in A are sampled uniformly from $[-c^0, c^0]$, where $c^0$ is appropriately scaled so that $CS(A) \approx c$. The biases are sampled uniformly from $[-1,1]$. Then random complete graphs and Erdos-Renyi (ER) graphs are generated. While generating ER graphs, an edge" in A with probability 0.5 is sampled. Experiments on estimating the mode (Section 3) as well as Z (Section 4) were performed. The algorithms mainly used for comparison are AIS, Spectral Approximate Inference (Spectral AI) and the method called relax-and-round, which performs inference by solving a low-rank programming relaxation and rounding via sampling at corners of the hyper cube $\{-1,1\}^n$. Note that for the binary MRFs considered in the partition function task, it is shown that they significantly outperform popular algorithms like belief propagation, mean-field approximation and mini-bucket variable elimination. Hence, a simply comparison to Spectral AI is performed. For AIS, there are 3 main parameters: (K, num cycles, num samples). All the results in any synthetic setting are averaged over 100 random problem instances.

Figure 1B:
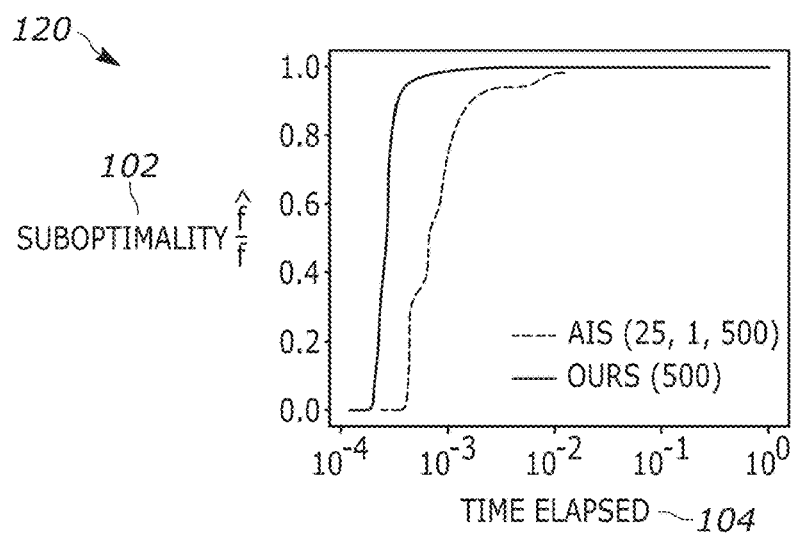
FIG. 1B illustrates a graphical representation of Sub-optimality in relation to elapsed time when k is 2 and N is 20.
Figure 1C:
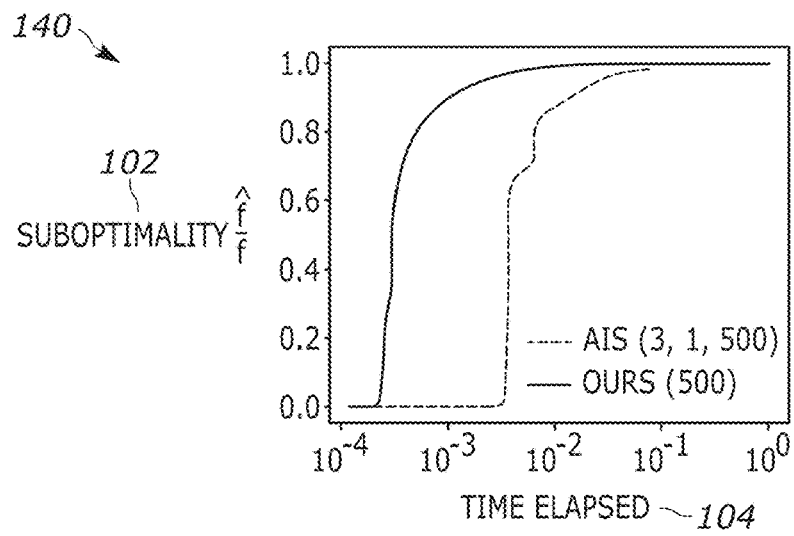
FIG. 1C illustrates a graphical representation of Sub-optimality in relation to elapsed time when k is 3 and N is 10.
Figure 2A:
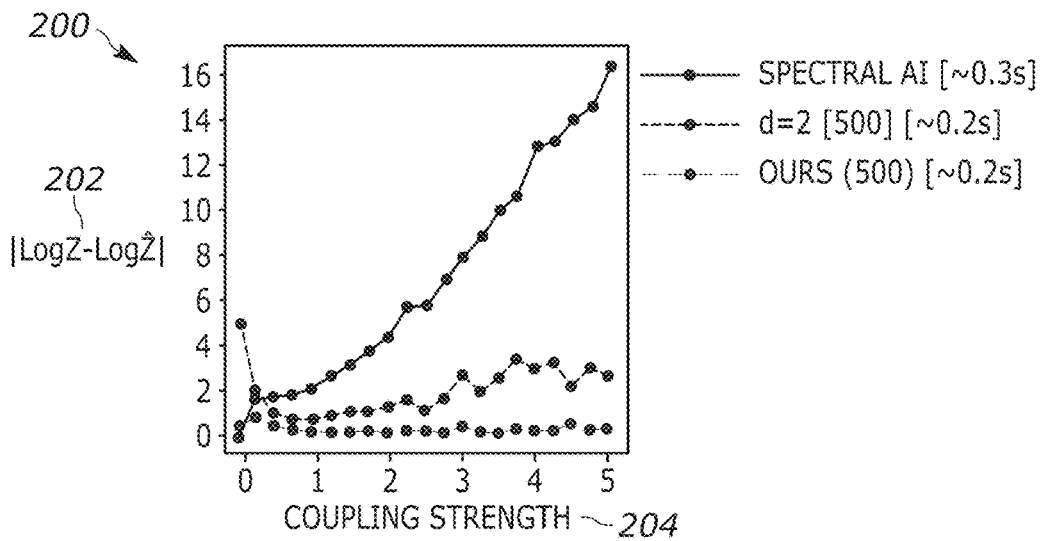
FIG. 2A illustrates a graphical representation of error in relation to coupling strength when k is 2 and N is 20.
Figure 2B:
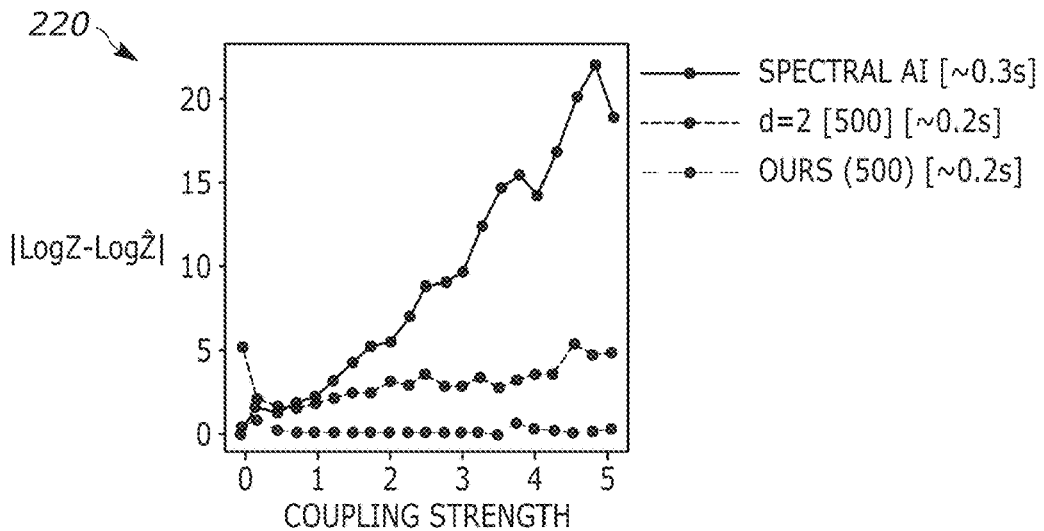
FIG. 2B illustrates a graphical representation of error in relation to coupling strength when k is 2 and N is 20.
Figure 2C:
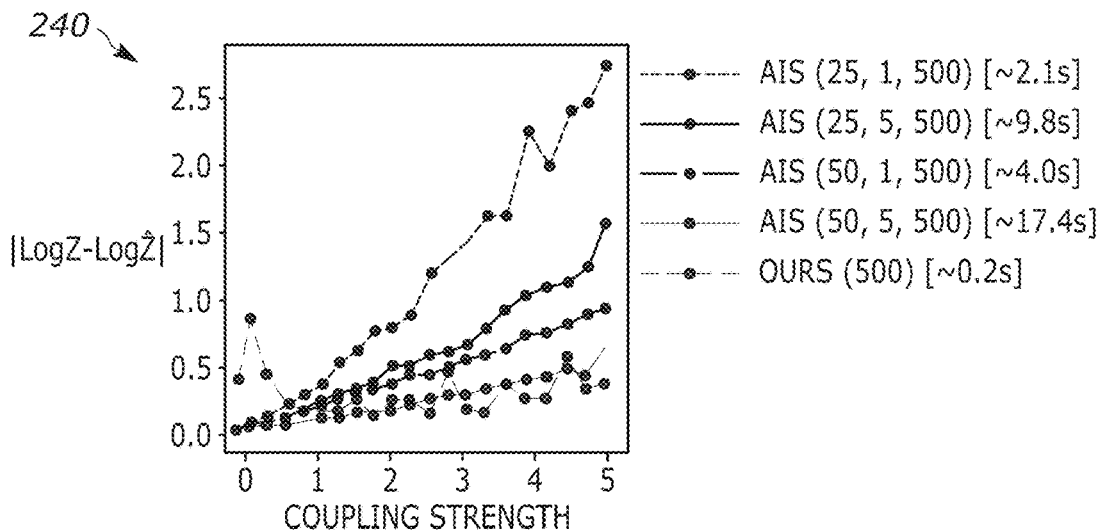
FIG. 2C illustrates a graphical representation of error in relation to coupling strength when k is 2 and N is 20.
Figure 3A:
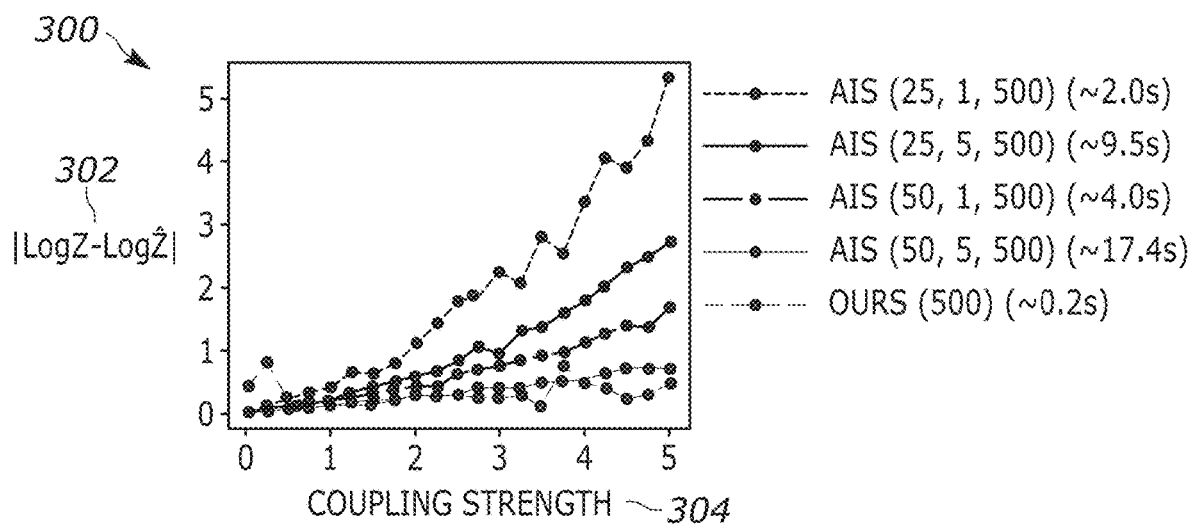
FIG. 3A illustrates a graphical representation of error in relation to coupling strength when k is 2 and N is 20.
Figure 3B:
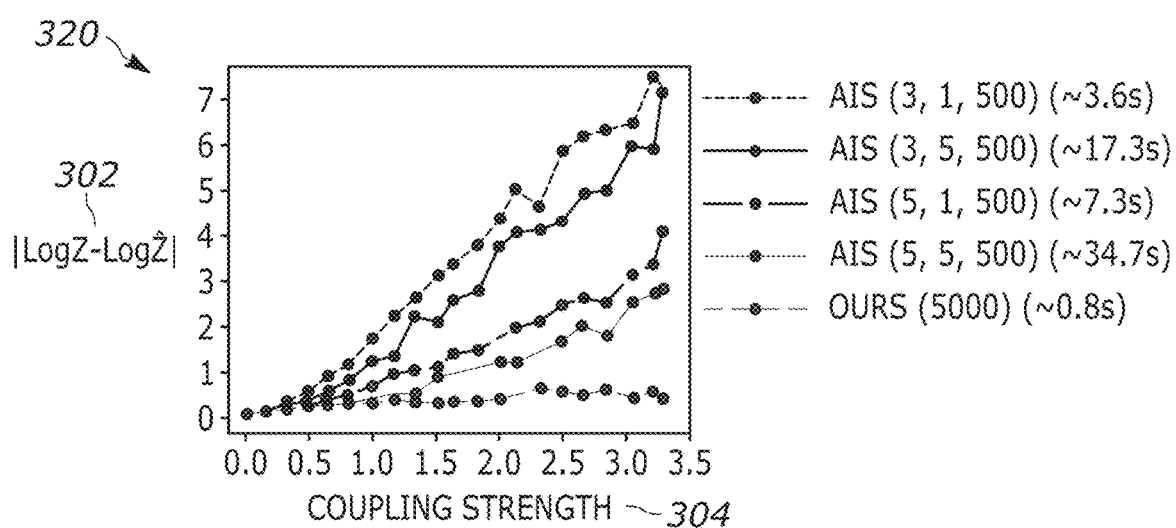
FIG. 3B illustrates a graphical representation of error in relation to coupling strength when k is 3 and N is 10.
Figure 3C:
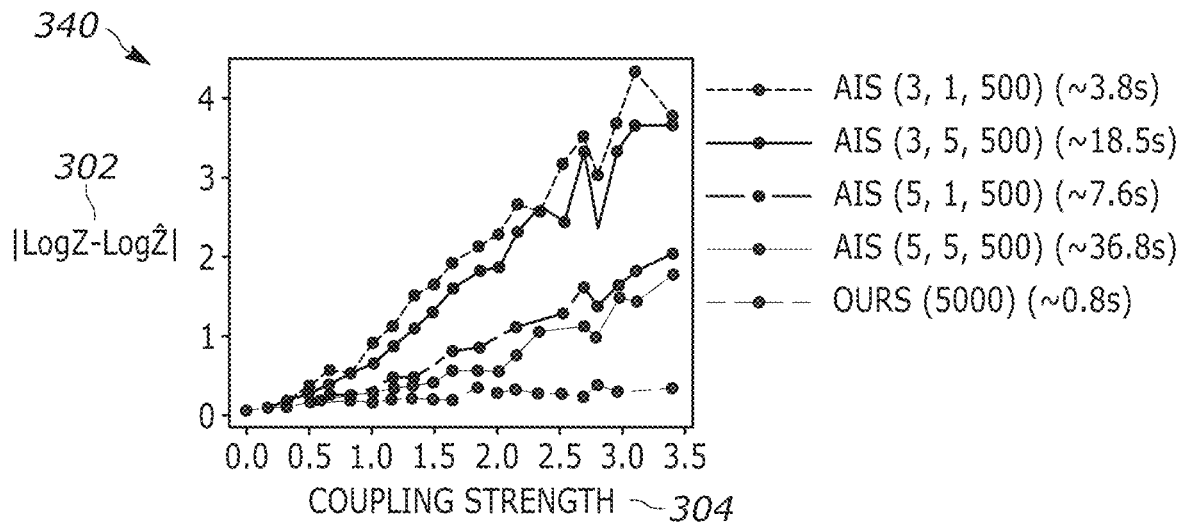
FIG. 3C illustrates a graphical representation of error in relation to coupling strength when k is 4 and N is 8.
Figure 3D:
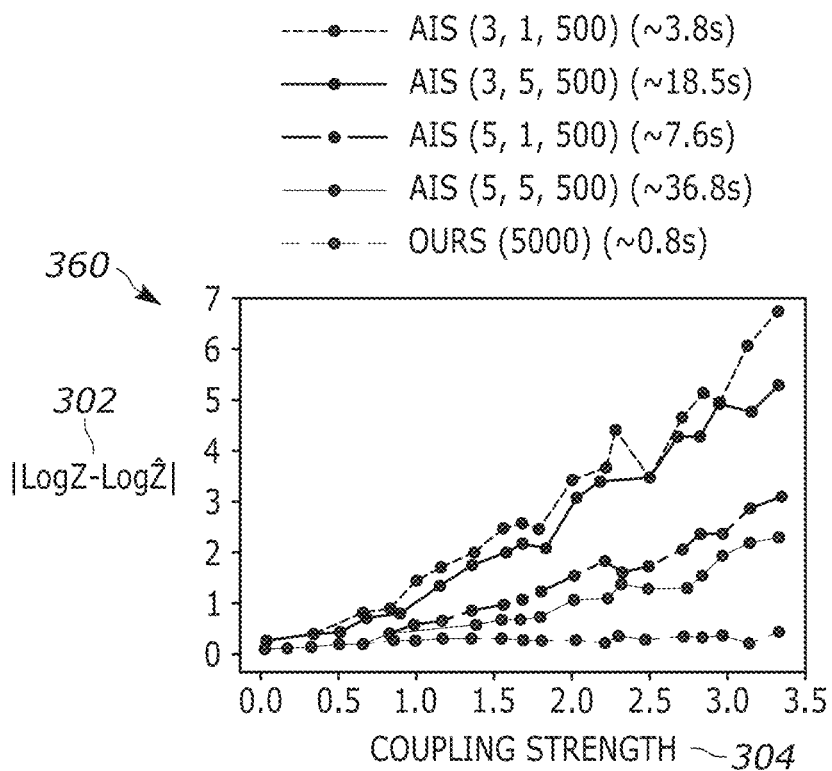
FIG. 3D illustrates a graphical representation of error in relation to coupling strength when k is 5 and N is 7.

For estimating the mode, consider matrices A with coupling strength 2.5. The aim of the experiment is to compare the quality of the mode estimate over progress of this algorithm and AIS. FIG. 1A illustrates a graphical representation 100 of Sub-optimality 102 in relation to elapsed time 104 when k is 2 and N is 20. FIG. 1B illustrates a graphical representation 120 of Sub-optimality 102 in relation to elapsed time 104 when k is 2 and N is 20. FIG. 1C illustrates a graphical representation 140 of Sub-optimality 102 in relation to elapsed time 104 when k is 3 and N is 10. FIG. 2A illustrates a graphical representation 200 of error 202 in relation to coupling strength 204 when k is 2 and N is 20. FIG. 2B illustrates a graphical representation 220 of error 202 in relation to coupling strength 204 when k is 2 and N is 20. FIG. 2C illustrates a graphical representation 240 of error 202 in relation to coupling strength 204 when k is 2 and N is 20. FIG. 3A illustrates a graphical representation 300 of error 302 in relation to coupling strength 304 when k is 2 and N is 20. FIG. 3B illustrates a graphical representation 320 of error 302 in relation to coupling strength 304 when k is 3 and N is 10. FIG. 3C illustrates a graphical representation 340 of error 302 in relation to coupling strength 304 when k is 4 and N is 8. FIG. 3D illustrates a graphical representation 360 of error 302 in relation to coupling strength 304 when k is 5 and N is 7. Elapsed time 104 is plotted on a log scale, and Sub-optimality 104, that is the ratio $\hat{f}/f$, in which $\hat{f}$ is the criterion value in (Eq. 5) at the mode estimate and f, the true mode. FIGS. 1A, and 1B illustrates the comparisons for binary complete graphs and ER graphs respectively, while FIG. 1C illustrates the comparison for a 3-class complete MRF. In the legend, the number in parentheses following this algorithm is the parameter R in Algorithm 3 and those in parentheses following AIS are (K, num cycles, num samples) respectively. It can be observed from the plots that this method is able to achieve a near optimal mode much quicker than AIS, underlining the efficacy of this method.

Next, is to evaluate the accuracy of the partition function estimate given by this algorithm. Consider coupling matrices over a range of coupling strengths and plot the error 202, 302 |log Z−log$\hat{Z}$| against the coupling strength 204, 304. Note that for k>2, there is no straightforward way in which to extend the formulation in Spectral AI to multiple classes; hence comparisons with AIS in this case are presented. In the binary case, note that $|r_1=-r_2|$; hence the use of a standard rounding procedure is used. (See FIG. 2A, 2B), one can observe that these estimates are more accurate than both Spectral AI and the relax-and-round method almost everywhere. Importantly, in the high coupling strength setting, in which the performance of Spectral AI becomes pretty inaccurate, this system and method are still able to maintain high accuracy. Note that with just 500 rounding iterations, the running time of this algorithm is faster than Spectral AI. Also consider the comprehensive comparisons with AIS in FIG. 2C, 3A, 3B, 3C over a range of parameter settings of K and num cycles. It is shown in the plots that on increasing the number of temperatures (K), the AIS estimates become more accurate, but suffer a lot with respect to time.

This section demonstrates that this method of inference is able to scale up to large fully connected CRFs used in image segmentation tasks. Here, consider a setting in which the task is to compute the configuration of labels $x \in [k]^n$ for the pixels in an image that maximizes:

$$\max_{x \in [k]^n} \sum_{i<j} \mu(x_i, x_j) \overline{K}(f_i, f_j) + \sum_i \psi_u(x_i)$$

The first term provides pairwise potentials where $\overline{K}$ is modelled as a Gaussian kernel that measures similarity between pixel-feature vectors $f_i$, $f_j$ and μ is the label compatibility function. The second term corresponds to unary potentials for individual pixels. As in the SDP relaxation described above, relax each pixel to a unit vector in $R^d$. Then model μ via an inner product, and base the unary potentials $\varphi_u$ on rough annotations provided with the images to derive the following objective:

$$\max_{v_i \in R^d, \|v_i\|_2=1} \sum_{i<j} \overline{K}(f_i, f_j) v_i^T v_j + \theta \sum_{i=1}^n \sum_{l=1}^k \log p_{i,l} \cdot v_i^T r_l \quad (15)$$

In the second term above, log $p_{i,l}$ plugs in this disclosures prior belief based on annotations for the pixel being assigned the $l^{th}$ label. The coefficient θ helps control the relative weight on pairwise and unary potentials. Note here that running MCMC-based methods on MRFs with as many nodes as pixels in standard images is generally infeasible. But this disclosure solves (Equation 15) efficiently via the mixing method. At convergence, using the rounding scheme described in section 0050 (see FIG. 8), this disclosure illustrates the ability to obtain accurate segmentations of images (FIG. 4C, 5C, 6C), competitive with the quality presented in DenseCRF.

This work presents a novel relaxation to estimate the mode in a general k-class Potts model that can be written as a low-rank SDP and solved efficiently by a recently proposed low-rank solver based on coordinate descent. It also proposed a simple and intuitive algorithm based on importance sampling which guarantees an unbiased estimate of the partition function. It set up experiments to empirically study the performance of this method as compared to relevant state-of-the-art methods in approximate inference, and verified that this relaxation provides an accurate estimate of the mode, while this algorithm for computing the partition function also gives fast and accurate estimates. It has also demonstrated that this method is able to scale up to very large MRFs in an efficient manner.

Probabilistic inference has been used in a number of domains including, e.g. the image segmentation domains highlighted in the final experimental results section of this disclosure. However, the methods have also been applied extensively to biological applications, such as a protein side chain prediction or protein design. Such applications all have the ability to be directly affected by upstream algorithmic improvements to approximate inference methods. This also, however, applies to potentially questionable applications of machine learning, such as those used by automated surveillance systems. While it may be difficult to assess the precise impact of this work in such domains (especially since the vast majority of deployed systems are based upon deep learning methods rather than probabilistic inference at this point), these are applications that should be considered in the further development of probabilistic approaches.

From a more algorithmic perspective, many applications of approximate inference in recent years have become dominated by end-to-end deep learning approaches, forgoing application of probabilistic inference altogether. One potential advantage of this approach, is that because it is based upon a continuous relaxation, the probabilistic inference method presented here can itself be made differentiable, and used within an end-to-end pipeline. This has potentially positive effects (it could help in the interpretability of deep networks, for example), but also negative effects, such as the possibility that the inference procedure itself actually becomes less intuitively understandable if it's trained solely in an end-to-end fashion.

Figures 4A, 4B, 4C:
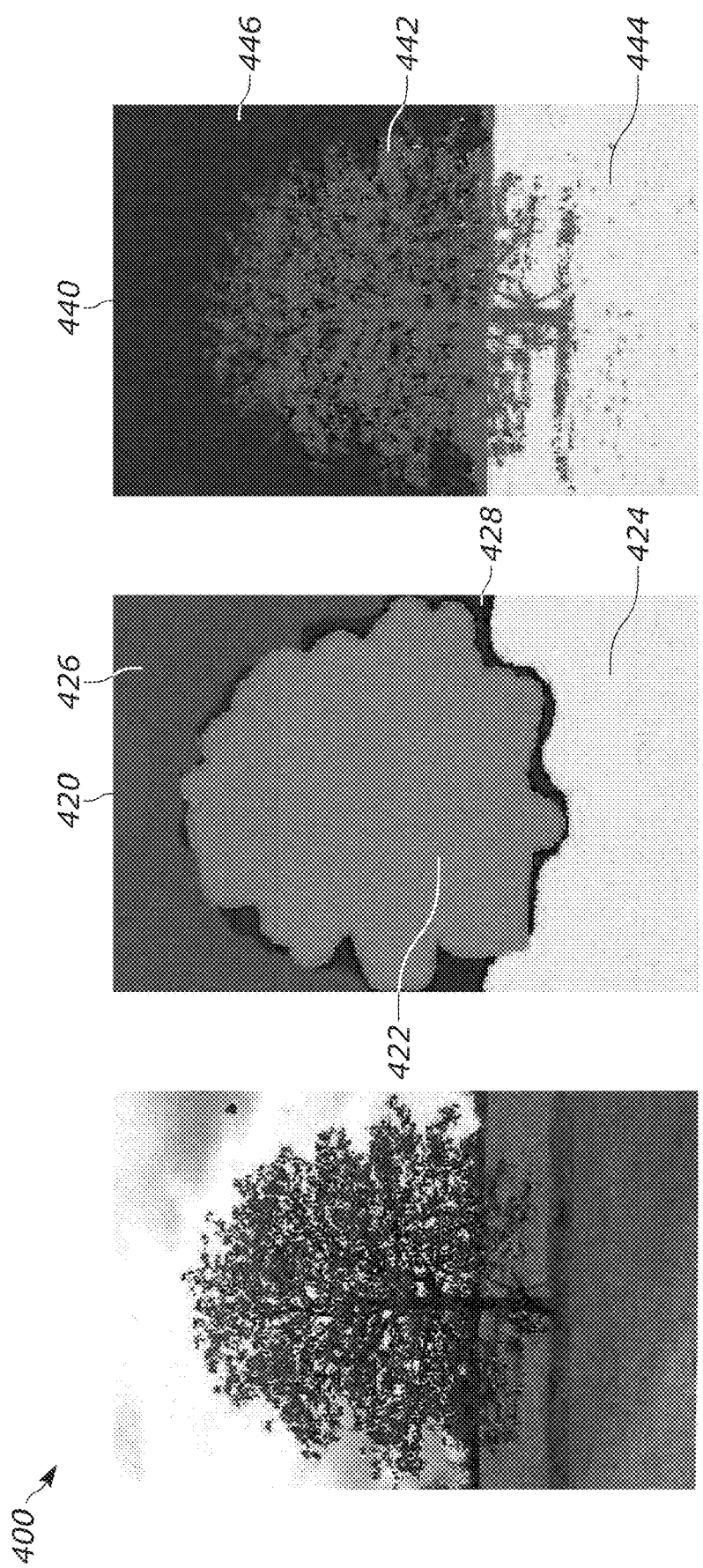
FIG. 4A illustrates a graphical representation of an image.
FIG. 4B illustrates a graphical representation of the image of FIG. 4A after annotation.
FIG. 4C illustrates a graphical representation of the image of FIG. 4A after Segmentation.

FIG. 4A illustrates a graphical representation of an image 400. FIG. 4B illustrates an annotated graphical representation 420 of the image 400 of FIG. 4A. The annotated graphical image 420 includes 4 classifications, a first classification 422, a second classification 424, a third classification 426, and a background classification 428. FIG. 4C illustrates a segmented graphical representation 440 of the image 400 of FIG. 4A. The segmented graphical representation 440 includes 2 segmentations, a target segmentation 442, and a foreground segmentation 444, and a background 446.

FIG. 5A illustrates a graphical representation of an image 500. FIG. 5B illustrates an annotated graphical representation 520 of the image 500 of FIG. 5A. The annotated graphical image 520 includes 4 classifications, a first classification 522, a second classification 524, a third classification 526, and a background classification 528. FIG. 5C illustrates a segmented graphical representation 540 of the image 500 of FIG. 5A. The segmented graphical representation 540 includes 4 segmentations, a target segmentation 542, and a foreground segmentation 544, a background segmentation 548, and a background 546.

FIG. 6A illustrates a graphical representation of an image 600. FIG. 6B illustrates an annotated graphical representation 620 of the image 600 of FIG. 6A. The annotated graphical image 620 includes 3 classifications, a first classification 622, a second classification 624, and a background classification 626. FIG. 6C illustrates a segmented graphical representation 640 of the image 600 of FIG. 6A. The segmented graphical representation 640 includes 2 segmentations, a target segmentation 642, and a foreground segmentation 644.

Figure 7:
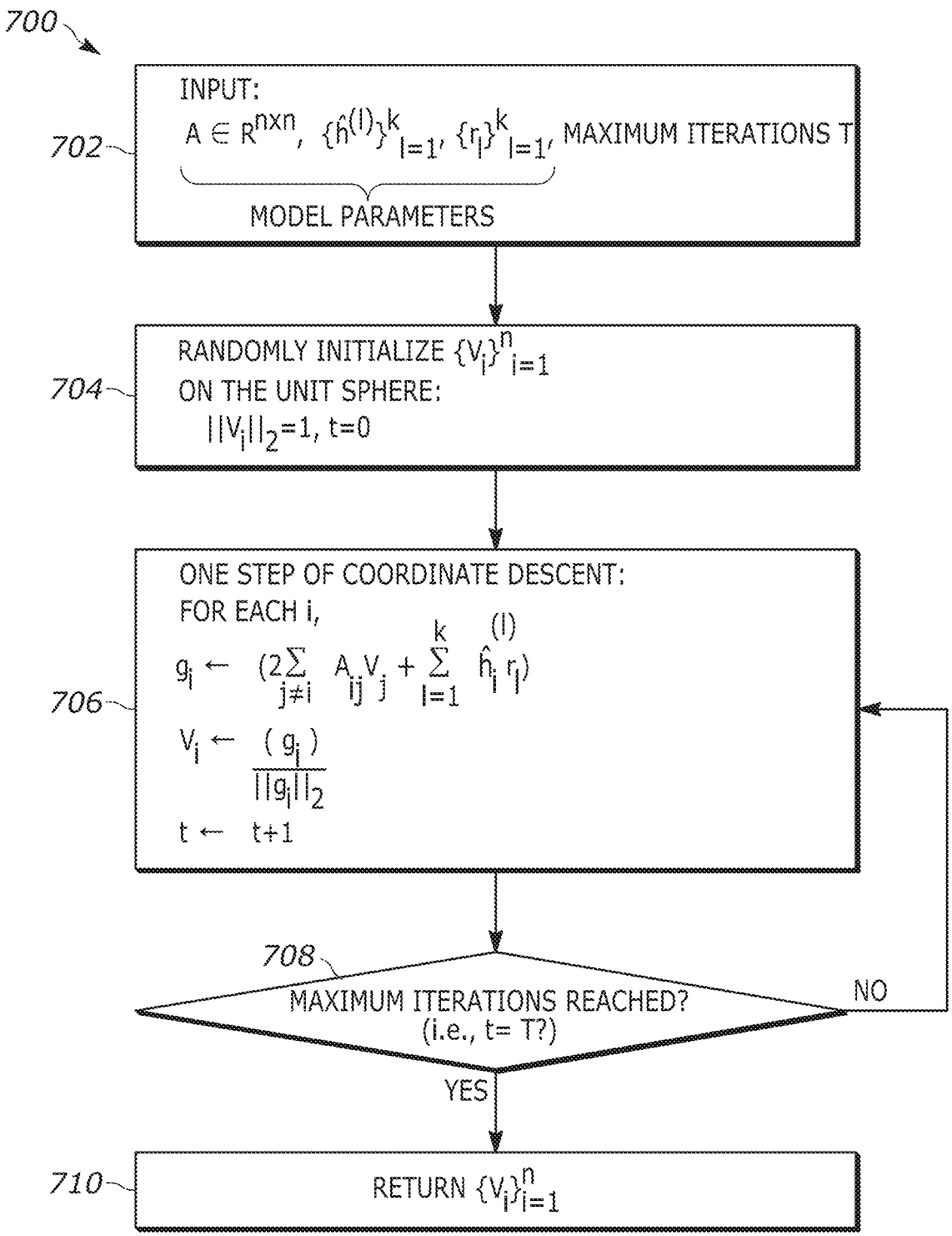
FIG. 7 is a flow diagram used to generate pixel vectors via the mixing method.

FIG. 7 is a flow diagram used to generate pixel vectors via the mixing method. In step 702, a controller (e.g., controller 1102, 1202, 1302, 1402, 1502, 1602) receives model parameters, class vectors $\{r_l\}_{l=1}^{k}$ and a maximum number of iterations. In step 704, pixel vectors $\{v_i\}_{i=1}^{n}$ are randomly initialized on the unit sphere (one for each pixel to be classified). In step 706, one step of the coordinate descent (as seen in Algorithm 1) is performed, which updates the pixel vectors $\{v_i\}_{i=1}^{n}$, and an iteration counter is incremented; step 708 ensures that the number of total iterations of coordinate descent performed is equal to the maximum number of iterations. The controller returns the optimized pixel vectors $\{v_i\}_{i=1}^{n}$ in step 710.

Figure 8:
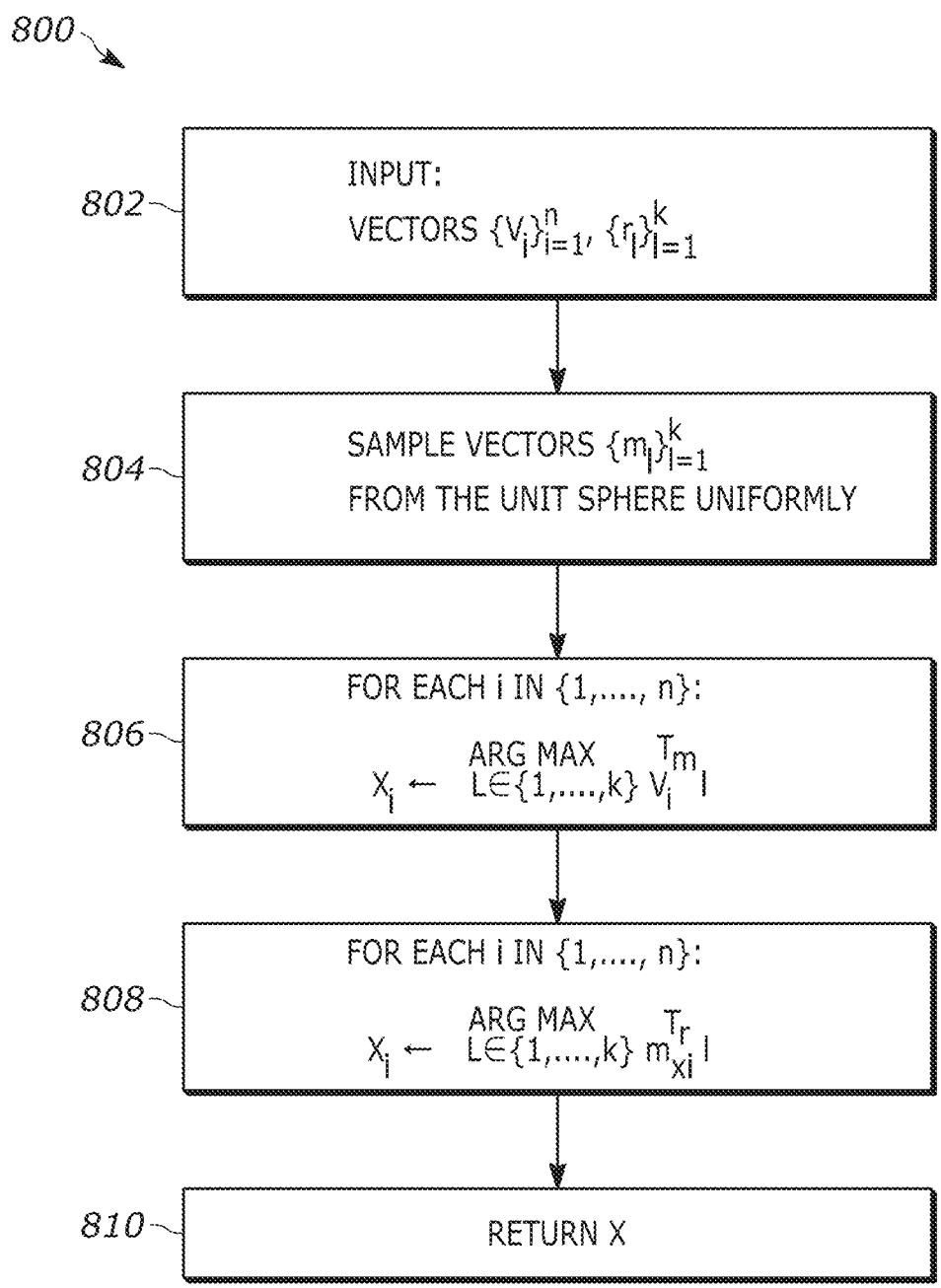
FIG. 8 is a flow diagram used to generate a single vector of length n indicative of the segmented image.

FIG. 8 is a flow diagram used to generate a single vector of length n indicative of the segmented image. In step 802, a controller (e.g., controller 1102, 1202, 1302, 1402, 1502, 1602) receives pixel vectors $\{v_i\}_{i=1}^{n}$ and class vectors $\{r_l\}_{l=1}^{k}$. In step 804, a set of rounding vectors $\{m_l\}_{l=1}^{k}$ are generated, and in step 806, for each pixel vector $v_i$, the index $x_i$ of the rounding vector with the largest inner product with $v_i$ is chosen. In step 808, for each index $x_i$ chosen in step 806, the index of the class vector with the largest inner product with $m_{x_i}$ is chosen and reassigned to $x_i$. In step 810, the controller returns the final vector x, which contains class predictions for each of the n pixels to be classified.

Figure 9:
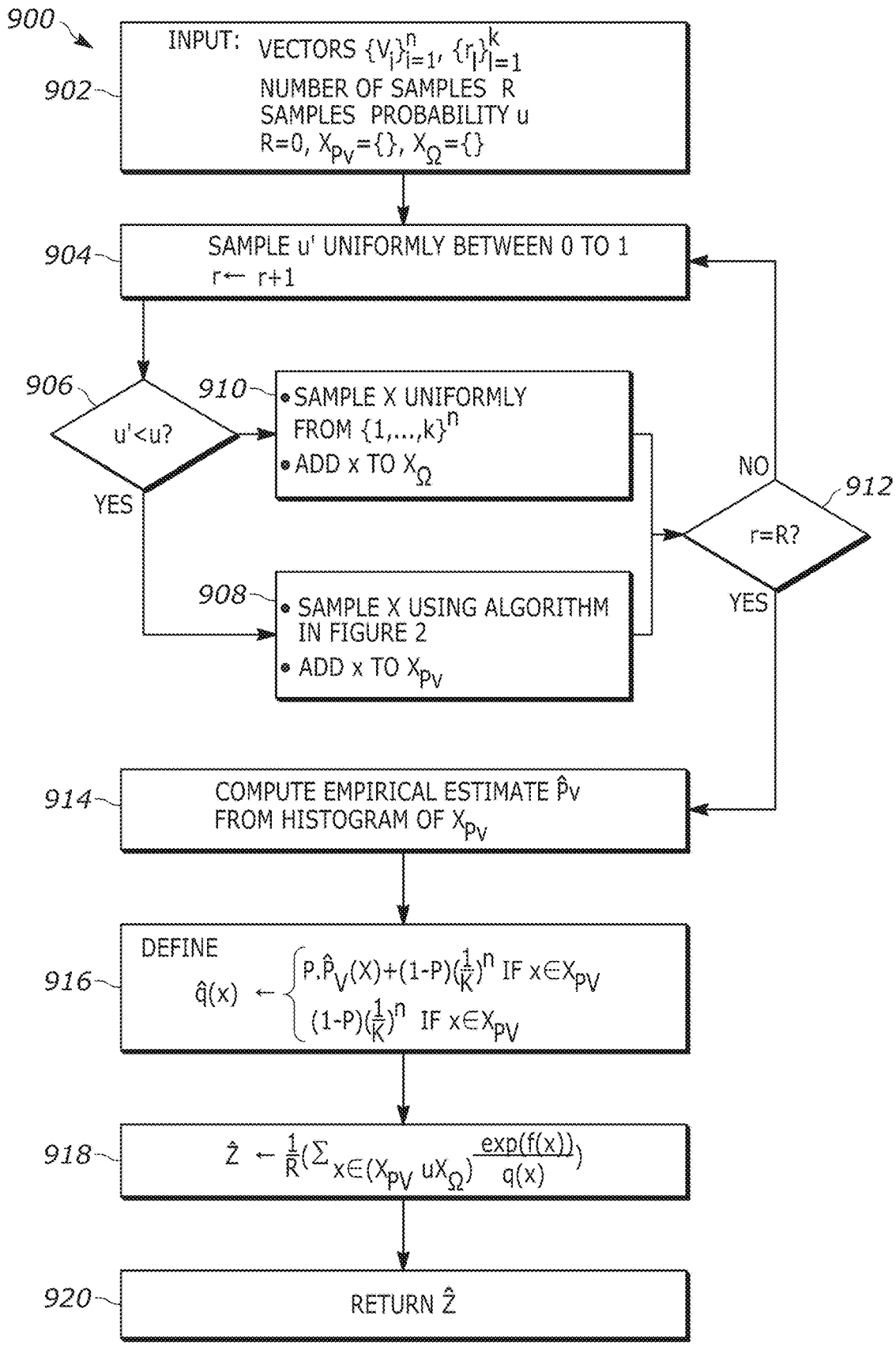
FIG. 9 is a flow diagram used to generate an estimation of the partition function Z.

FIG. 9 is a flow diagram used to generate an estimation of the partition function Z. In step 902, a controller (e.g., controller 1102, 1202, 1302, 1402, 1502, 1602) receives pixel vectors, class vectors, a number of samples R, and a sample probability u. In steps 904, 906, 908, 910, and 912, the controller produces R samples, which are collected in two sets: for each sample, a number u' is sampled uniformly between 0 and 1 (step 904). The value of u' is compared to u (step 906) and based on this comparison, x is either sampled from the mode of the distribution using FIG. 8 (step 908) and added to the set $X_{p_v}$, or sampled uniformly from $[k]^n$ (step 910) and added to $X_\Omega$. The number of samples collected is counted in step 904; step 912 compares this value to the number R of total samples to be collected. Once R samples are collected, the controller computes the empirical distribution $\hat{p}_v$ based on the mode samples $X_{p_v}$ (step 914). With $\hat{p}_v$, step 916 defines an estimate $\hat{q}$ of the true distribution, and in step 918 the partition function $\hat{Z}$ of this estimated distribution is computed; this is the estimate of the partition function of the model, which is returned by the controller in step 920.

Figure 10:
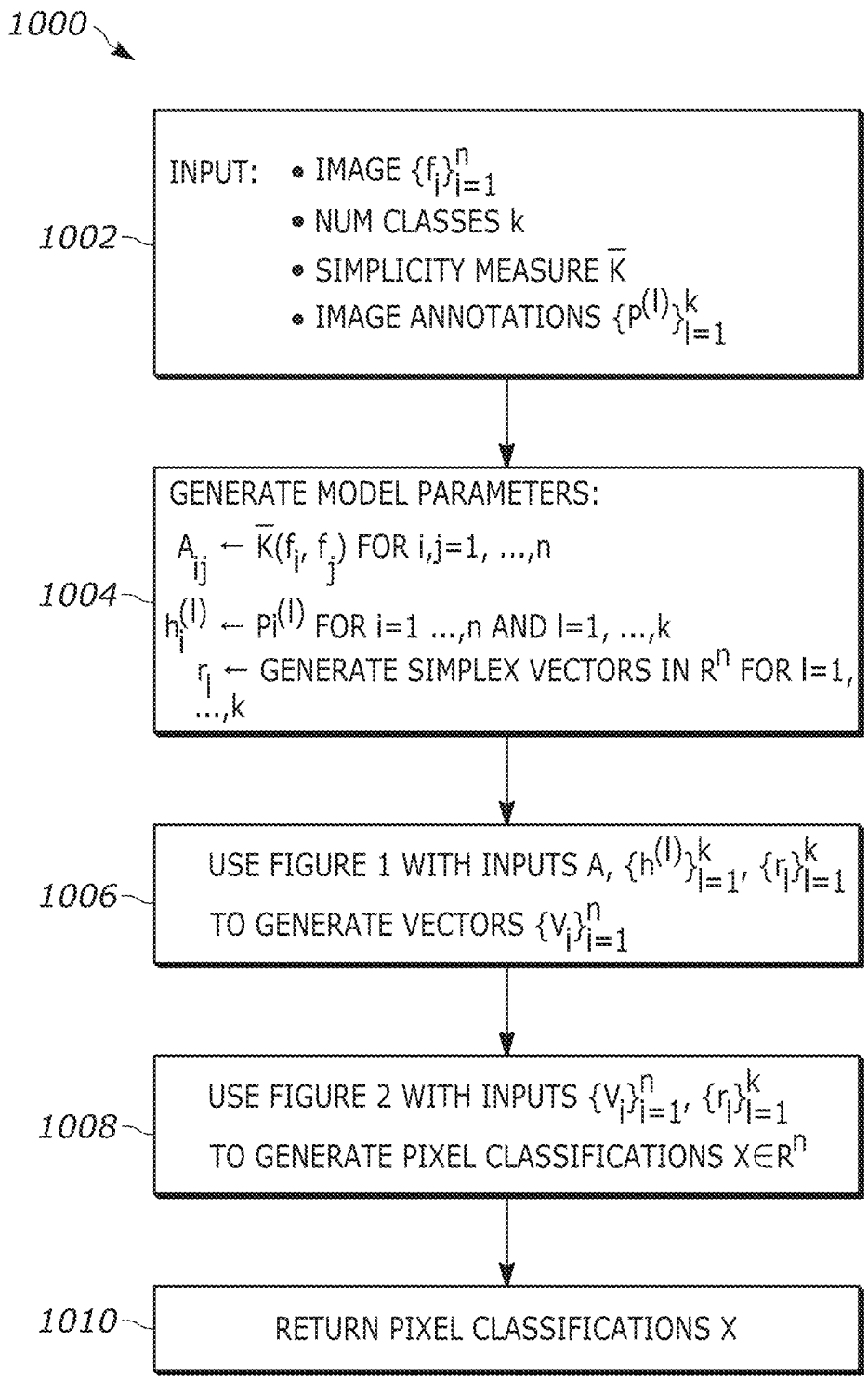
FIG. 10 is a flow diagram used to generate a single vector of length n indicative of the segmented image.

FIG. 10 is a flow diagram used to generate a single vector of length n indicative of the segmented image. In step 1002, a controller (e.g., controller 1102, 1202, 1302, 1402, 1502, 1602) receives an image, a set of image annotations, which contains prior knowledge or estimates about the classification of each pixel of the input image, and a similarity measure $\overline{K}$. In step 1004, the controller uses these inputs to generate Markov random field parameters and class vectors. In step 1006, the controller uses the model parameters and class vectors to generate pixel vectors using the method described in FIG. 7. Using the pixel vectors found in step 1006, as well as the class vectors generated in step 1004, step 1008 generates class predictions for each pixel in the image, that is, a single segmentation vector of length n, or equivalently, a single segmentation vector of dimension n (e.g., a single segmentation vector of n-dimensions), in which each entry of the segmentation vector corresponds to a class prediction for a particular pixel in the image. These pixel classifications are returned by the controller in step 1010.

Figure 11:
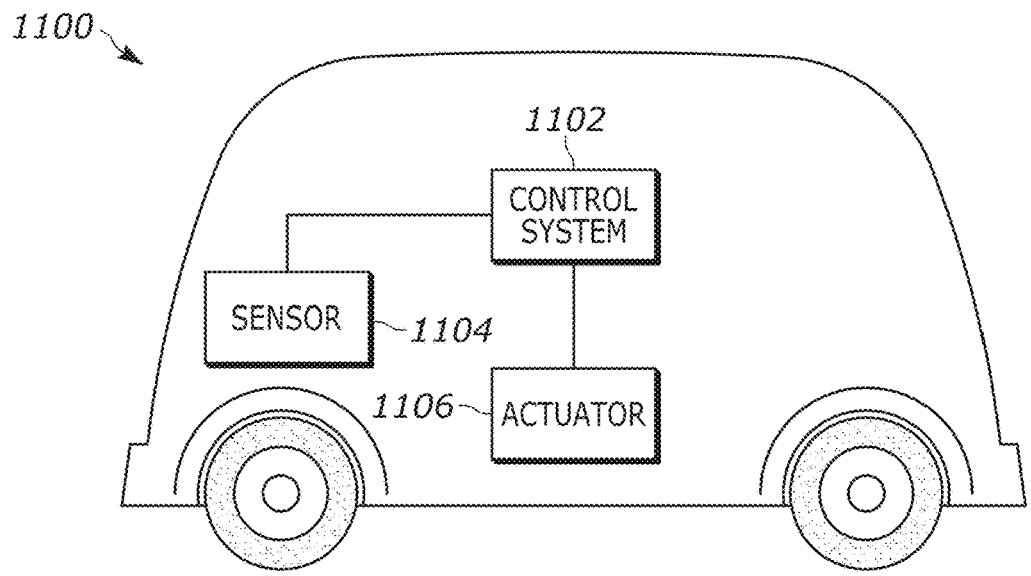
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more visual light based sensor (e.g., a Charge Coupled Device CCD, or video), radar, LiDAR, ultrasonic, infrared, thermal imaging, or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104. One non-limiting example of a software module includes a weather information software module configured to determine a present or future state of the weather proximate the vehicle or other location.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. For example, control system 1102 may segment an image or other input from sensor 1104 into one or more background classes and one or more object classes (e.g. pedestrians, bicycles, vehicles, trees, traffic signs, traffic lights, road debris, or construction barrels/cones, etc.), and send control commands to actuator 1106, in this case embodied in a brake system or propulsion system, to avoid collision with objects. In another example, control system 1102 may segment an image into one or more background classes and one or more marker classes (e.g., lane markings, guard rails, edge of a roadway, vehicle tracks, etc.), and send control commands to actuator 1106, here embodied in a steering system, to cause the vehicle to avoid crossing markers and remain in a lane. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image and annotation information from sensor 1104. Using these and a prescribed number of classes k and similarity measure $\overline{K}$ that are stored in the system, the control system 1102 may use the method described in FIG. 10 to classify each pixel of the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above in sections 0067-0071. Signals may also be sent to sensor 1104 based on this classification, for example, to focus or move a camera lens.

Figure 12:
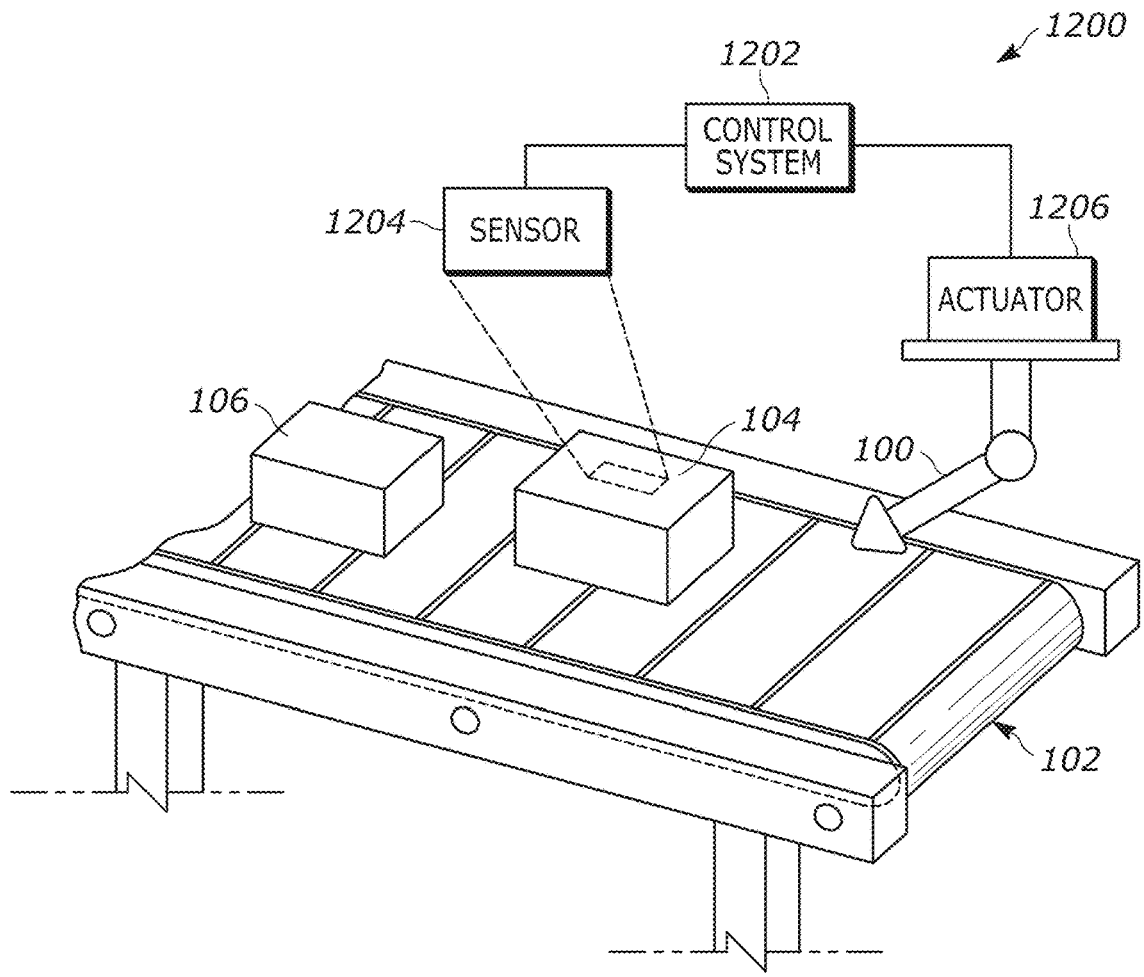
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to a control system (e.g., manufacturing machine).

Sensor 1204 of system 1200 (e.g., manufacturing machine) may be an optical sensor configured to capture one or more properties of a manufactured product. Control system 1202 may be configured to determine a state of a manufactured product from one or more of the captured properties. Actuator 1206 may be configured to control system 1202 (e.g., manufacturing machine) depending on the determined state of manufactured product 104 for a subsequent manufacturing step of the manufactured product. The actuator 1206 may be configured to control functions of FIG. 11 (e.g., manufacturing machine) on subsequent manufactured products of the system (e.g., manufacturing machine) depending on the determined state of the previous manufactured product.

In this embodiment, the control system 1202 would receive image and annotation information from sensor 1204. Using these and a prescribed number of classes k and similarity measure $\overline{K}$ that are stored in the system, the control system 1202 may use the method described in FIG. 10 to classify each pixel of the image received from sensor 1204, for example, to segment an image of a manufactured object into two or more classes, to detect anomalies in the manufactured product, to ensure the presence of objects on the manufactured product such as barcodes. Based on this classification, signals may be sent to actuator 1206. For example, if control system 1202 detects anomalies in a product, actuator 1206 may mark or remove anomalous or defective products from the line. In another example, if control system 1202 detects the presence of barcodes or other objects to be placed on the product, actuator 1106 may apply these objects or remove them. Signals may also be sent to sensor 1204 based on this classification, for example, to focus or move a camera lens.

Figure 13:
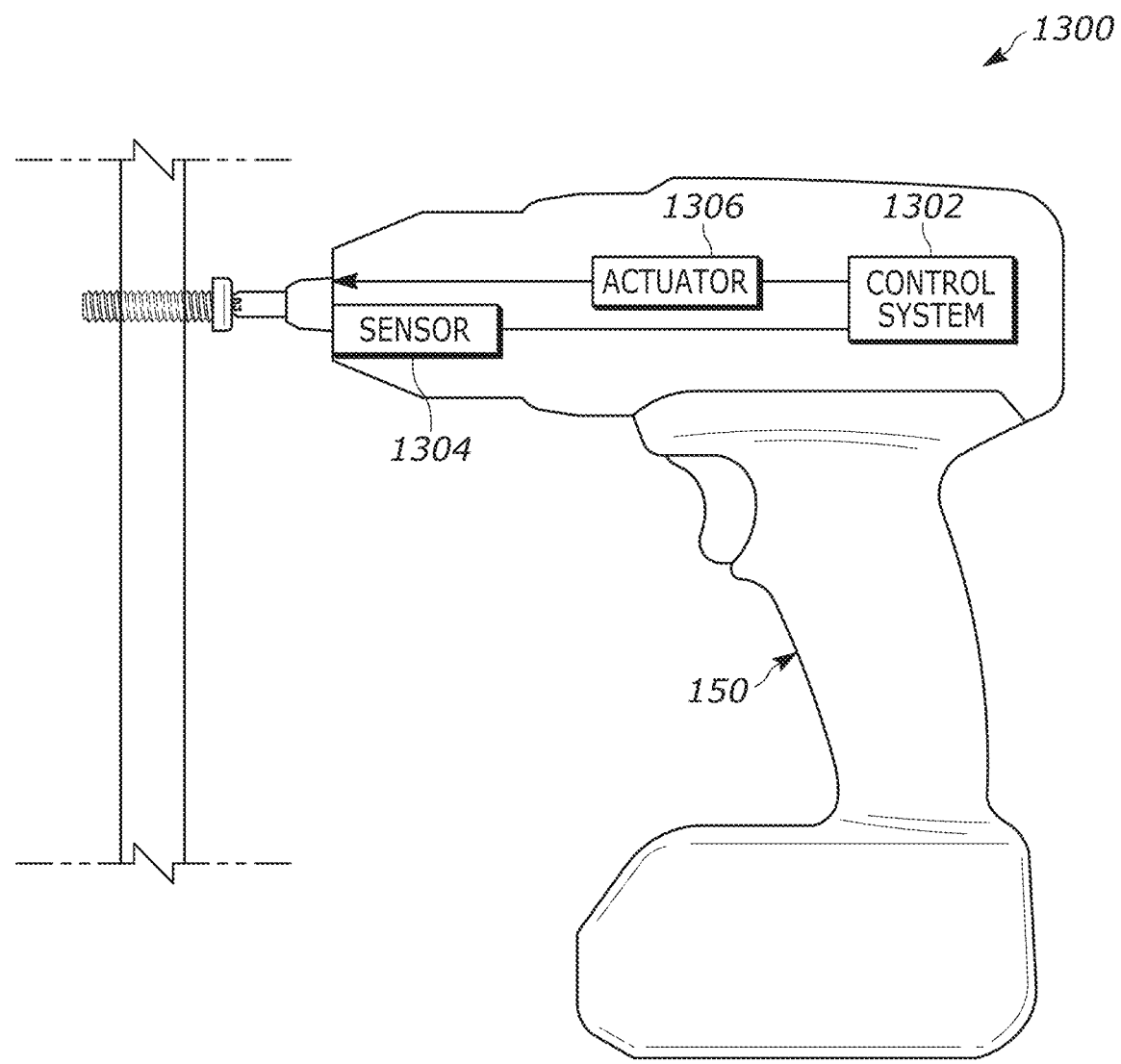
FIG. 13 is a schematic diagram of a control system configured to control a power tool.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be an optical sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image and annotation information from sensor 1304. Using these and a prescribed number of classes k and similarity measure $\overline{K}$ that are stored in the system, the control system 1302 may use the method described in FIG. 10 to classify each pixel of the image received from sensor 1304 in order to segment an image of a work surface or fastener into two or more classes or to detect anomalies in the work surface or fastener. Based on this classification, signals may be sent to actuator 1306, for example to the pressure or speed of the tool, or any of the actions performed by the actuator 1306 as described in the above sections. Signals may also be sent to sensor 1304 based on this classification, for example, to focus or move a camera lens. In another example, the image may be a time series image of signals from the power tool 1300 such as pressure, torque, revolutions per minute, temperature, current, etc. in which the power tool is a hammer drill, drill, hammer (rotary or demolition), impact driver, reciprocating saw, oscillating multi-tool, and the power tool is either cordless or corded.

Figure 14:
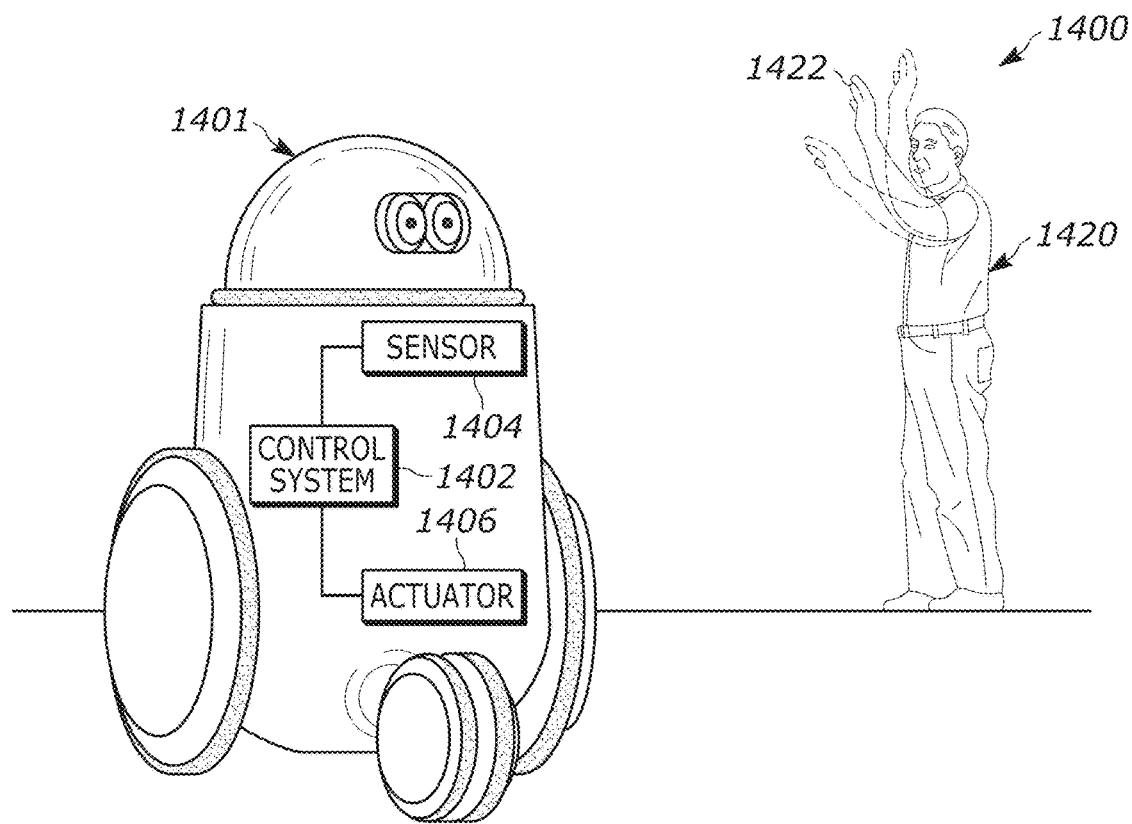
FIG. 14 is a schematic diagram of a control system configured to control an automated personal assistant.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image and annotation information from sensor 1404. Using these and a prescribed number of Classes k and similarity measure $\overline{K}$ that are stored in the system, the control system 1402 may use the method described in FIG. 10 to classify each pixel of the image received from sensor 1404, for example, to segment an image of an appliance or other object to manipulate or operate. Based on this classification, signals may be sent to actuator 1406, for example, to control moving parts of automated personal assistant 1401 to interact with domestic appliances, or any of the actions performed by the actuator 1406 as described in the above sections. Signals may also be sent to sensor 1404 based on this classification, for example, to focus or move a camera lens.

Figure 15:
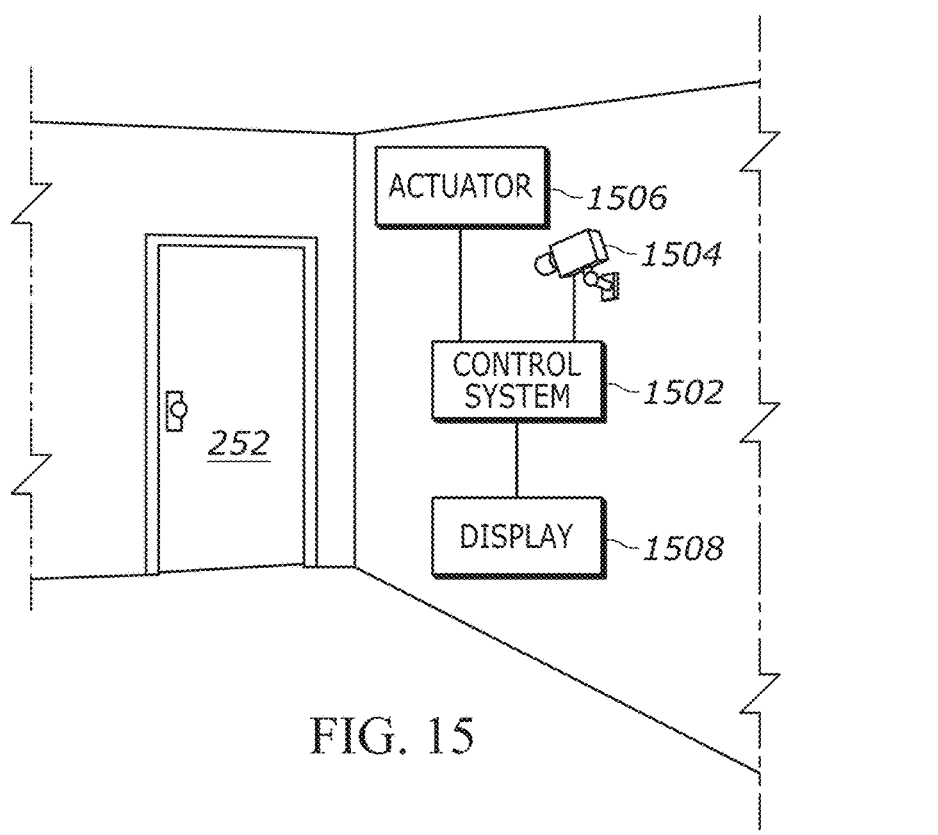
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical sensor configured to generate and transmit image and/or video data. Such data may be used by control system 1502 to detect a person's face.

Monitoring system 1500 may also be a surveillance system. In such an embodiment, sensor 1504 may be an optical sensor configured to detect a scene that is under surveillance and control system 1502 is configured to control display 1508. Control system 1502 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, etc.). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image and annotation information from sensor 1504. Using these and a prescribed number of classes k and similarity measure $\overline{K}$ that are stored in the system, the control system 1502 may use the method described in FIG. 10 to classify each pixel of the image received from sensor 1504 in order to, for example, detect the presence of suspicious or undesirable objects in the scene, to detect types of lighting or viewing conditions, or to detect movement. Based on this classification, signals may be sent to actuator 1506, for example, to lock or unlock doors or other entryways, to activate an alarm or other signal, or any of the actions performed by the actuator 1506 as described in the above sections. Signals may also be sent to sensor 1504 based on this classification, for example, to focus or move a camera lens.

Figure 16:
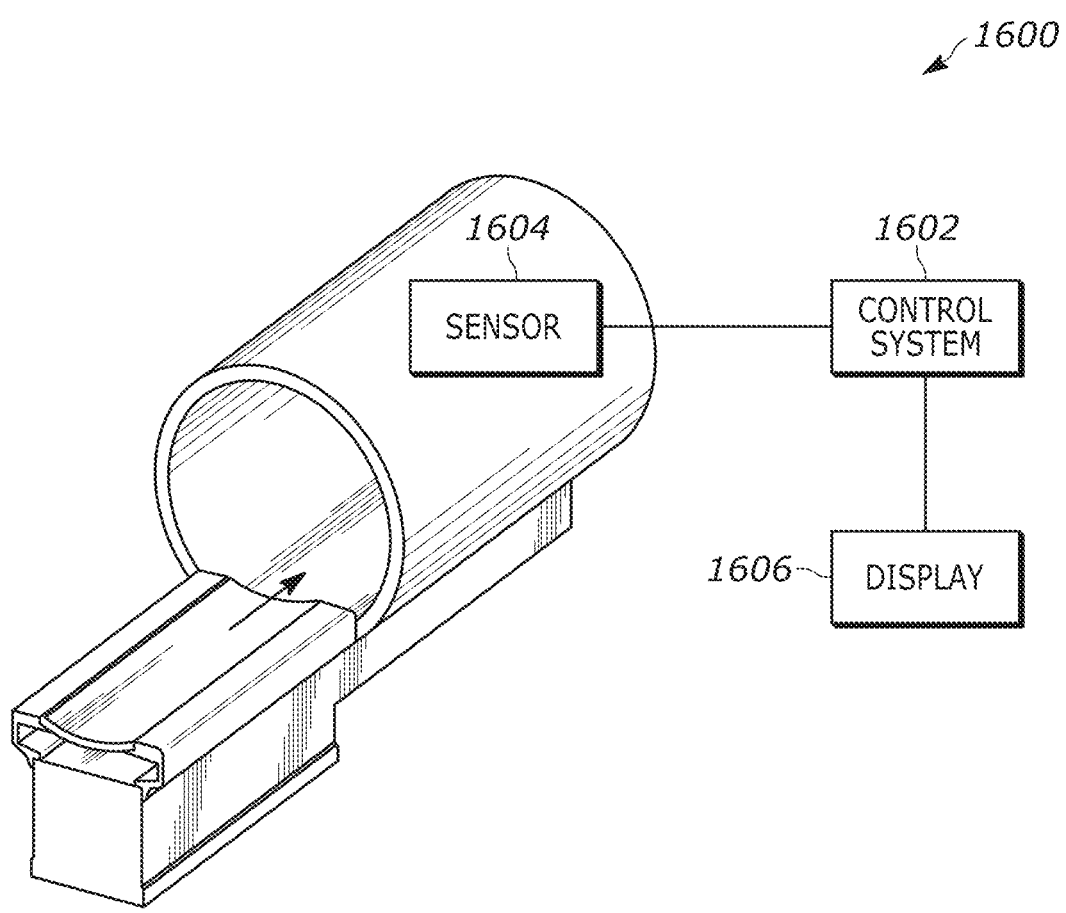
FIG. 16 is a schematic diagram of a control system configured to control a medical imaging system.

FIG. 16 depicts a schematic diagram of control system 1602 configured to control imaging system 1600, for example an MRI apparatus, x-ray imaging apparatus or ultrasonic apparatus. Sensor 1604 may, for example, be an imaging sensor. Control system 1602 may be configured to determine a classification of all or part of the sensed image. Control system 1602 may be configured to determine or select an actuator control command in response to the classification obtained by the trained neural network. For example, control system 1602 may interpret a region of a sensed image to be potentially anomalous. In this case, the actuator control command may be determined or selected to cause display 1606 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method of image segmentation comprising:
    receiving an image of n pixels, and an annotation of the image;
    forming a coupling matrix, k class vectors each of length n, and a bias coefficient based on the image and the annotation;
    generating n pixel vectors each of length n based on the coupling matrix, class vectors, and bias coefficient;
    creating a single segmentation vector of length n from the pixel vectors wherein each entry in the segmentation vector identifies one of the k class vectors; and
    outputting the single segmentation vector.

2. The method of claim 1, wherein the n pixel vectors are generated based utilizing received model parameters, class vectors, and a maximum number of iteration.

3. The method of claim 1, wherein the n pixel vectors include correlation data between each pair of the n pixels.

4. The method of claim 1, wherein each of the n pixel vectors is rounded to a predicted class, and wherein all pixel classifications are collected in a single n-dimensional segmentation vector.

5. The method of claim 4, wherein the predicted class is one of at least 2 predicted classes of at least either a background class or one or more foreground classes.

6. The method of claim 1, wherein the image is received from a first sensor and the annotation of the image is received from a second sensor.

7. The method of claim 6, wherein the first sensor is an optical, light, imaging, or photon sensor.

8. The method of claim 7, wherein the second sensor is a thermal, heat, or temperature sensor.

9. The method of claim 8 further including controlling a mechanical system based on the single segmentation vector.

10. A system for controlling a physical system via segmentation of an image comprising:
    a controller configured to,
    receive an image of n pixels from a first sensor, and an annotation of the image from a second sensor;
    form a coupling matrix, k class vectors each of length n, and a bias coefficient based on the image and the annotation;
    generate n pixel vectors each of length n based on the coupling matrix, class vectors, and bias coefficient;
    create a single segmentation vector of length n from the pixel vectors wherein each entry in the segmentation vector identifies one of the k class vectors;
    output the single segmentation vector; and
    operate the physical system based on the single segmentation vector.

11. The system of claim 10, wherein the first sensor is an optical, light, or photon sensor.

12. The system of claim 11, wherein the second sensor is LIDAR, radar, sonar, thermal, heat, or temperature sensor.

13. The system of claim 12, wherein the n pixel vectors include correlation data between each pair of the n pixels.

14. The system of claim 13, wherein each of the n pixel vectors is rounded to a predicted class, and wherein all pixel classifications are collected in a single n-dimensional segmentation vector.

15. A system for segmenting an image for vehicle control comprising:
    a first sensor configured to generate an image of n pixels;
    a second sensor configured to generate an annotation of the image;
    a controller configured to,
    receive an image of n pixels, and an annotation of the image;
    form a coupling matrix, k class vectors each of length n, and a bias coefficient based on the image and the annotation;
    generate n pixel vectors each of length n based on the coupling matrix, class vectors, and bias coefficient;
    create a single segmentation vector of length n from the pixel vectors wherein each entry in the segmentation vector identifies one of the k class vectors;
    output the single segmentation vector; and
    operate the vehicle based on the single segmentation vector.

16. The system of claim 15, wherein first sensor is an optical, light, or photon sensor.

17. The system of claim 16, wherein the second sensor is LIDAR, radar, sonar, thermal, heat, or a temperature sensor.

18. The system of claim 17, wherein the n pixel vectors include correlation data between each pair of the n pixels and each of the n pixel vectors is rounded to a predicted class, and wherein all pixel classifications are collected in a single n-dimensional segmentation vector.

19. The system of claim 18, wherein the predicted class includes one of a pedestrian, bicycle, vehicle, tree, traffic sign, traffic light, road debris, or construction barrel/cone.

20. The system of claim 18, wherein the predicted class includes one of a lane marking, guard rail, edge of a roadway, or vehicle tracks.

* * * * *